United States Patent Office 2,877,229
Patented Mar. 10, 1959

2,877,229

PROCESS FOR THE MANUFACTURE OF INDOLES AND PRODUCTS OBTAINED THEREBY

William Irving Taylor, Summit, N. J., assignor to Ciba Pharmaceutical Products, Inc., Summit, N. J., a corporation of New Jersey No Drawing. Application April 19, 1957
Serial No. 653,750

12 Claims. (Cl. 260—293.2)

This invention relates to a new process for the manufacture of indoles and to the products, intermediates, salts and quaternary compounds formed thereby. More particularly it concerns a novel process for preparing compounds structurally related to the alkaloids isolated from plant material of the *Tabernanthe iboga* such as ibogaine and tabernanthine, and the products and intermediates as well as salts and quaternary compounds obtained thereby.

Ibogaine is an alkaloid found among other alkaloidal substances in the root of *Tabernanthe iboga* having the following formula:

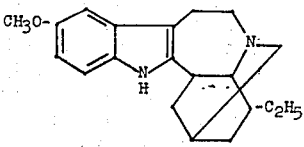

Ibogaine shows the following physical data: M. P. 151°; $[\alpha]_D = -53 \pm 1°$ (in ethanol); U. V. spectra (in ethanolic solution): maxima at 228–230 m$\mu$ and 298–300 m$\mu$; I. R. spectra (taken in Nujol and given in reciprocal centimeters): 3381, 2970–2840, 1625, 1592, 1560, 1490, 1455, 1437, 1379, 1366, 1338, 1330, 1318, 1287, 1263, 1217, 1187, 1167, 1149, 1111, 1101, 1030, 998, 981, 957, 903, 847, 830, 807, 795.

Ibogaine is recommended for the treatment of trypanosomiasis and is also reported to cause choline esterase inhibition, to produce hypotension in the anaesthetized dog, to show antagonism to the carotid occlusion reflex and inhibitory effects on intestinal motility.

The alkaloid tabernanthine, isolated from the root of the plant *Tabernanthe iboga*, has the same empirical formula as ibogaine, namely $C_{20}H_{26}N_2O$ and has the following formula:

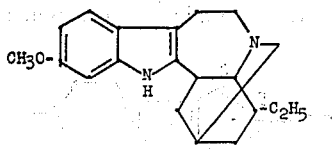

Tabernanthine shows the following physical data: M. P. 210–211 $[\alpha]_D = -40° \pm 1°$ (acetone); U. V. spectra (in ethanolic solution): maxima at 226–228 m$\mu$, 268 m$\mu$ and 297–299 m$\mu$; I. R. spectra (taken in Nujol and given in reciprocal centimeters): 3351, 2950–2840, 1654, 1625, 1610, 1588, 1563, 1499, 1460, 1450, 1433, 1375, 1360, 1339, 1325, 1306, 1294, 1285, 1273, 1248, 1232, 1224, 1201, 1180, 1160, 1126, 1097, 1025, 1000, 978, 950, 933, 909, 892, 929, 907, 903.

Tabernanthine is a central nervous system stimulant and can be employed in the treatment of various states of depression, fatigability, narcolepsy, etc.

In the course of my investigations concerning the preparation of compounds having an ibogaine-like or tabernanthine-like structure I have found that it is possible to demethylate the methoxy group of ibogaine or tabernanthine or a salt thereof, for example, by boiling with an aqueous hydrogen halide such as hydrogen bromide. However, upon treatment with an alkylating agent such as a diazoalkane the thus-obtained desmethyl-ibogaine or desmethyl-tabernanthine cannot be converted into compounds having an alkylated hydroxyl group in the indole portion of the molecule. By using, for example, methyliodide as the alkylating compound in the presence of an acid-binding agent there are obtained amorphous products which are not identical with either ibogaine or tabernanthine.

I have now found that by treatment of ibogaine or tabernanthine or salts thereof with an oxidizing agent compounds having the empirical formula: $C_{20}H_{24}N_2O_2$ can be obtained which show in the infrared absorption spectra a characteristic amide band at 1646 (expressed in reciprocal centimeters), and which have the formula:

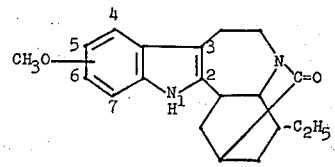

wherein the methoxy group is located either in the 5- or 6-position of the indole portion of the molecule depending on the starting material, i. e. ibogaine or tabernanthine used in the oxidation step. Further proof of the formation of a lactam is furnished by the fact that the compounds obtained can be converted into the parent compounds ibogaine or tabernanthine respectively upon treatment with a reducing agent capable of converting an amide into an amine, such as lithium aluminum hydride. Surprisingly, neither ibogaine nor tabernanthine undergo an extensive oxidation degradation of the skeleton under the oxidation conditions employed in the described process and the lactams formed can be easily converted into the starting materials upon reduction.

Treatment of a lactam thus formed with a hydrolyzing agent capable of splitting a mixed aliphatic-aromatic ether grouping, such as hydrogen bromide in acetic acid, yields the demethylated lactam having a free hydroxyl group in the indole portion of the molecule and the formula:

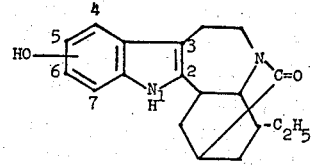

wherein the hydroxyl group stands either in the 5- or 6-position of the indole portion.

Although, as indicated above, neither desmethyl-ibogaine nor desmethyl-tabernanthine can be re-alkylated, I have now found that the demethylated lactams obtained either from ibogaine or tabernanthine by the method described above can be converted into lactams having the hydrogen of the hydroxyl group substituted by a lower hydrocarbon residue. This conversion can be accomplished by reacting the demethylated lactams with an agent capable of replacing the hydrogen of a weakly phenolic free hydroxyl group by a lower hydrocarbon residue, such as for example esters of alcohols with strong acids such as hereinafter specified. Such lactams can be reduced to form compounds having the formula:

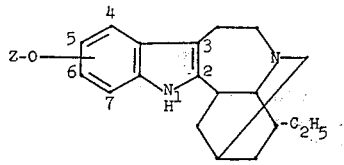

wherein Z stands for a lower hydrocarbon radical, the residue Z—O— being either in position 5 or 6 of the indole portion of the molecule, and salts thereof. This conversion can be achieved by reduction of the lactams, for example, by treatment with a di-light metal hydride, such as lithium aluminum hydride.

My invention, therefore, concerns especially the compounds having the skeleton common to the lactams of both alkaloids ibogaine and tabernanthine, showing the following formula:

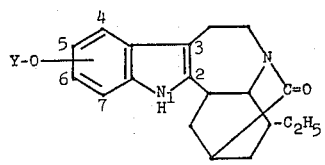

wherein Y represents hydrogen or a lower hydrocarbon residue, the residue Y—O— being either in the 5- or 6-position of the indole portion of the molecule, and the process for their preparation. Lower hydrocarbon radicals contemplated are particularly hydrocarbon radicals having from 1 to 7 carbon atoms, more especially alkyl, e. g. methyl, ethyl, propyl, iso-propyl or butyl; alkenyl, e. g. allyl; cycloalkyl, e. g. cyclopentyl or cyclohexyl, or aralkyl, e. g. benzyl. As outlined above the process for the preparation of these compounds consists in treating ibogaine or tabernanthine or a salt thereof with an oxidizing agent, splitting the ether of the indole portion of the lactam obtained and, if desired, treating the demethylated lactam with a reagent capable of replacing the hydrogen of the free hydroxyl group by a lower hydrocarbon radical. These compounds are useful intermediates in the preparation of compounds having the ibogaine or tabernanthine structure. Thus, lactams, in which the phenolic hydroxyl group has been converted into a lower hydrocarbonoxy group, may be treated with an agent capable of converting an amide group into an amino group by forming compounds having the ibogaine or tabernanthine structure. This converison can be brought about, for example, by treatment with a di-light metal hydride, such as lithium aluminum hydride.

Oxidizing agents bringing about the conversion of ibogaine or tabernanthine or a salt thereof into the corresponding lactam are the inorganic oxidizing agents chromic acid, preferably used in a pyridine solution, potassium permanganate, preferably in an alkaline medium and especially iodine, preferably in the presence of an alkaline agent such as sodium bicarbonate.

The demethylation of the lactam formed in the oxidation step can be carried out by treatment with strong Lewis acids such as hydrohalic acids e. g. hydrogen chloride, hydrogen bromide or hydrogen iodide, or pyridine hydrochloride or aluminum chloride. I prefer to use hydrobromic acid in acetic acid.

Replacement of the hydrogen of the free hydroxyl group in the demethylated lactam by a lower hydrocarbon residue can be achieved upon treatment with agents capable of replacing the hydrogen atom of a weakly phenolic hydroxyl group by a lower hydrocarbon radical. Such agents are for example esters of alcohols with strong acids such as alkyl halides, e. g. methyl-iodide or ethylbromide; alkenyl halides, e. g. allylchloride; cycloalkyl halides, e. g. cyclohexyl chloride; aralkyl halides, e. g. benzyl chloride or esters of sulfuric acid, e. g. dimethyl sulfate or diethyl sulfate. Esters are used more especially in the presence of an acid-binding agent such as an alkali metal or alkaline earth metal hydroxide, e. g. sodium or potassium hydroxide.

The new lactams are important intermediates in the preparation of products having the skelton common to both alkaloids ibogaine and tabernanthine and having a hydroxyl group substituted by a lower hydrocarbon residue either in the 5- or 6-position of the indole portion. As stated above, these compounds can be prepared from the lactams formed by the process of the invention by reduction of the amide group, for example by treatment with a di-light metal hydride, such as lithium aluminum hydride.

Of these compounds those having the formula:

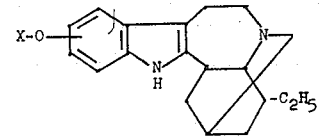

wherein X represents a lower hydrocarbon residue having more than one carbon atom, the grouping X—O— being either in the 5- or 6-position of the indole portion, as well as salts and quaternary ammonium compounds thereof, are new and are intended to be included within the scope of this application. Lower hydrocarbon residues contemplated are particularly those having from two to seven carbon atoms, more especially alkyl residues such as ethyl, propyl, isopropyl or butyl; alkenyl residues such as allyl; cycloalkyl residues such as cyclohexyl; or aralkyl residues such as benzyl. As salts, especially therapeutically useful acid addition salts, are contemplated, e. g. those of the hydrohalic acids, for example, hydrochloric acid, or nitric acid, sulfuric acid, phosphoric acids, perchloric acids, acetic, citric, oxalic, tartaric, ascorbic, methane sulfonic, hydroxyethane sulfonic, p-toluene sulfonic acid or salicylic, p-amino salicylic or acetyl salicylic acid. Quaternary ammonium compounds are more especially those with esters of alcohols with strong inorganic and organic acids such as esters of alkanols with hydrohalic acids, e. g. methyl-iodide, ethyl-bromide or propyl chloride, or with sulfuric acid, e. g. dimethylsulfate or with p-toluene sulfonic acid, e. g. methyl p-toluene sulfonate.

They show a stimulating effect on the central nervous system and can be used in the psychiatric treatment of depressed patients such as for example depressed and catatonic schizophrenics. The dose levels at which these compounds are used will vary considerably depending upon the extent of the depressed state, the desires of the practising psychiatrist and other considerations. Generally however, a quantity from about 0.1 mg. to about 200 mg. administered orally is a safe and effective dose.

In addition to the process for the manufacture of the lactams described above my invention includes also a process for the preparation of compounds having the formula:

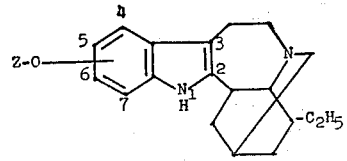

wherein Z represents a lower hydrocarbon residue, the grouping Z—O— being either in the 5- or 6-position of the indole portion, by treating a lactam having the formula:

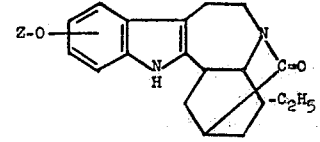

wherein Z has the meaning given above, with a reducing agent capable of converting an amide group into an amino group, and, is desired, converting a product having a tertiary amino group into a salt or a quaternary ammonium compound and/or converting any salt obtained into the free base. Amides are reduced to amines more especially upon treatment with a di-light metal hydride such as lithium aluminum hydride.

Depending upon the working conditions the products of the process are obtained in the form of the free bases or the salts. Free bases may be converted into the salts such as acid addition salts in the customary manner, and the free bases can be obtained as usual from the salts. Quaternary compounds are formed for example by treatment of a product having a tertiary amino group with an ester of an alcohol with a strong acid such as an alkyl halide, e. g. methyl iodide, or alkyl sulfate, e. g. dimethyl sulfate.

The reactions may be carried out in the absence or presence of a solvent, at room temperature or with heating, in an open vessel or under pressure, preferably in an atmosphere of nitrogen.

The invention comprises also any process, wherein an intermediate obtainable at any stage of the process of the invention is used as starting material and the remaining steps are carried out.

This application is a continuation-in-part of my patent application Serial No. 590,825, filed June 12, 1956, now abandoned.

The examples which follow are given in the way of illustration and should not be construed as a limitation. Many modifications will appear obvious to the man skilled in the art and it is intended that such obvious modifications are also comprised by my invention. Temperatures are given in degrees centigrade.

Example 1

A solution of 2.8 g. of iodine in 40 ml. of tetrahydrofuran is added slowly over a period of one hour to a refluxing mixture of 2 g. of ibogaine in a mixture of 50 ml. of tetrahydrofuran and 40 ml. of a saturated solution of sodium bicarbonate while stirring. The cooled reaction mixture is extracted with 50 ml. of methylene chloride which is washed successively with sodium thiosulfate solution, 2 N sulfuric acid and water, then dried over sodium sulfate and concentrated to dryness. The residue is crystallized from 95 percent ethanol to yield ibogaine lactam, M. P. 218°. This lactam shows the following physical data: $[\alpha]_D^{25} = -9 \pm 1°$ (in ethanol); I. R. spectrum (taken in Nujol, given in reciprocal centimeters): 3216, 2955–2865, 1646, 1589, 1538, 1490, 1460, 1378, 1366, 1337, 1298, 1260, 1221, 1186, 1140, 1104, 1041, 1030, 991, 971, 845, 832, 822, 799.

Example 2

The mixture of 0.5 g. of tabernanthine in 23 ml. of tetrahydrofuran containing 10 ml. of a 50 percent saturated sodium bicarbonate solution is refluxed with stirring during the slow addition of the solution of 0.42 g. of iodine in 10 ml. of tetrahydrofuran. After the addition of water, the reaction mixture is extracted with methylene chloride, which is washed successively with sodium thiosulfate solution, dilute sulfuric acid and water, dried over sodium sulfate and concentrated to dryness. Sublimation of the residue at 180° in high vacuum gives the tabernanthine lactam, which crystallizes from methanol in stout rods, M. P. 312–315°, and shows in the infrared spectrum (taken in Nujol) the characteristic amide band of 1650 cm.$^{-1}$.

Example 3

The mixture of 0.5 g. of ibogaine lactam (Example 1) in 7.5 ml. of acetic acid and 1.5 ml. of 49 percent hydrobromic acid is gently refluxed under an atmosphere of nitrogen for three and one half hours. The cooled reaction mixture is diluted with water, the crude demethylated ibogaine lactam is filtered off and crystallized from 95 percent ethanol. It has an M. P. 184–188° (foaming) which after drying under reduced pressure rises to 275°. The infrared absorption spectrum (taken in Nujol) shows the characteristic amide band of 1630 cm.$^{-1}$.

Example 4

A solution of 0.5 g. of demethylated ibogaine lactam (Example 3) in 30 ml. of ethanol is refluxed in the presence of 0.2 g. of potassium hydroxide and 0.3 ml. of dimethyl sulfate in an atmosphere of nitrogen. After one hour, the same quantity of potassium hydroxide and dimethyl sulfate are added again and refluxing is continued for an additional hour. The cooled reaction mixture is extracted with methylene chloride which after drying over magnesium sulfate and concentration to dryness furnishes the ibogaine lactam.

Example 5

A solution of 0.5 g. of demethylated ibogaine lactam (Example 3) in 50 ml. of ethanol is refluxed in the presence of 0.2 g. of potassium hydroxide and 0.3 ml. of diethyl sulfate in an atmosphere of nitrogen. After one hour the same quantities of potassium hydroxide and diethyl sulfate are added again and refluxing is continued for one additional hour. The cooled reaction mixture is extracted with methylene chloride which after drying over magnesium sulfate and concentration to dryness furnishes O-ethyl desmethyl ibogaine lactam, M. P. 218°, $[\alpha]_D^{26} = -11 \pm 1°$ (in ethanol).

Example 6

Ibogaine lactam (Example 3) is refluxed in tetrahydrofuran in the presence of 0.13 g. of lithium aluminum hydride for four hours. A small quantity of water is then added to the cooled reaction mixture and after filtration and evaporation to dryness ibogaine is obtained by crystallization from 95 percent ethanol.

Salts and quarternary ammonium compounds of ibogaine can be obtained by the following procedures:

Ibogaine is dissolved in methanol and a slight excess of methanolic hydrochloride is added. After concentration to dryness, followed by crystallization from water the ibogaine hydrochloride is obtained, M. P. 297° (with decomposition).

In a similar manner ibogaine hydrobromide, M. P. 285° (with decomposition) is obtained.

0.5 g. of ibogaine is heated 2 ml. of dimethyl sulfate for three hours at 100°. Water is added and the mixture is extracted with ether. The aqueous solution is passed through a column of amberlite (IRA 410 in the sulfate form). The eluate is concentrated to dryness and the residue is crystallized from 95% ethanol to yield the ibogaine methosulfate, M. P. above 305°.

Example 7

A solution of 0.24 g. of O-ethyl desmethyl ibogaine lactam in 15 ml. of tetrahydrofuran is refluxed for three hours in the presence of 0.25 g. of lithium alminum hydride. After addition of a small quantity of water to the cooled reaction mixture and filtration, the crude O-ethyl desmethyl ibogaine is obtained on evaporation of the solvent. The crystalline hydrochloride of the base melts at 260° (with decomposition), $[\alpha]_D^{24} = -66.5 \pm 1°$ (in ethanol).

Example 8

A solution of 1.00 g. of ibogaine in 10 cc. of pyridine is added slowly to 1.00 g. of chromium trioxide in 17 cc. of pyridine with cooling. The solution is allowed to stand at room temperature for 23 hours. Part of the pyridine is removed under reduced pressure. The remaining solution is diluted with 50 cc. of methylene chloride and filtered, and the filtrate is extracted once with dilute sodium hydroxide and twice with water. The aqueous solutions are extracted twice with methylene chloride. The combined ethylene chloride solutions are dried over sodium sulfate, filtered and evaporated to dryness under reduced pressure. The residue is crystallized from ethanol-ether, yielding 0.44 g. of ibogaine lactam, M. P. 213–215°.

*Example 9*

0.80 g. of tabernanthine dissolved in 8 ml. of pyridine is treated with 0.80 g. of chromium oxide in 13 cc. of pyridine. The product is extracted and worked up as described in Example 10 and crystallized from a mixture of methylene chloride-ether, yielding a mixture of 0.33 g. of tabernanthine lactam, M. P. 288–292°. The recrystallization from methanol and ether gives 0.25 g. of the product, M. P. 290–295°.

After drying at 78° a sample melts at 312–315°.

*Example 10*

A solution of 0.04 g. of tabernanthine lactam (see Example 2) in 20 ml. of tetrahydrofuran is refluxed with 0.20 g. of lithium aluminum hydride for three hours. The mixture is cooled and diluted carefully with water, filtered and then extracted with dilute sulfuric acid. Upon treatment with dilute sodium hydroxide solution the crude tabernanthine is obtained, which is recrystallized from ethanol, M. P. 210°.

What is claimed is:

1. Process for the preparation of compounds having the formula:

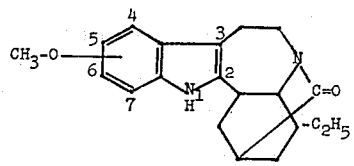

wherein Z represents a lower hydrocarbon radical, and the grouping Z—O— stands in one of the positions 5 and 6 of the indole portion, which comprises treating a member of the group consisting of ibogaine, tabernanthine and a salt thereof with an oxidizing agent selected from the group consisting of chromic acid, an alkali permanganate and iodine and isolating a lactam of the formula:

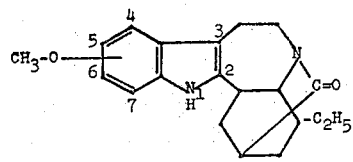

wherein the grouping $CH_3O$— stands in one of the positions 5 and 6 of the indole portion.

2. A process according to claim 1, wherein iodine in the presence of an alkaline bicarbonate is used.

3. A process according to claim 1, wherein chromium trioxide in the presence of pyridine is used.

4. Process for the preparation of compounds having the formula:

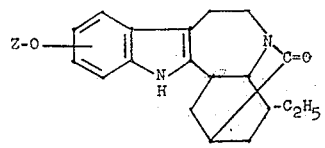

wherein Z represents a lower alkyl radical, and the grouping Z—O— stands in one of the positions 5 and 6 of the indole portion which comprises treating a compound of the formula:

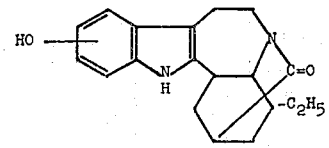

wherein the hydroxyl group stands in one of the positions 5 and 6 of the indole portion, with an ester of a lower alkanol with a strong acid.

5. A process according to claim 4, wherein diethyl sulfate in the presence of potassium hydroxide is used.

6. Process for the preparation of a member of the group consisting of compounds having the formula:

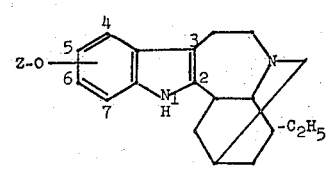

wherein Z represents a lower alkyl radical and the grouping Z—O— stands in one of the positions 5 and 6 of the indole portion, acid addition salts and quaternary lower alkyl ammonium compounds thereof, which comprises treating a compound of the formula:

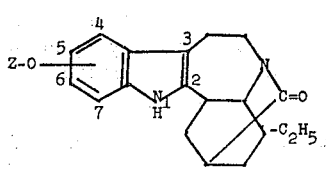

wherein Z has the above meaning and the grouping Z—O— stands in one of the positions 5 and 6 of the indole portion, with a di-light metal hydride.

7. A process according to claim 6, wherein lithium aluminum hydride is used as a reducing agent.

8. Compounds of the formula:

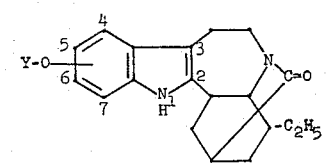

wherein Y is a member of the group consisting of hydrogen and a lower alkyl radical, and wherein the grouping Y—O— stands in one of the positions 5 and 6 of the indole portion.

9. A compound of the formula:

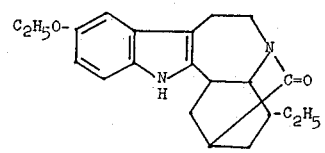

10. A compound of the formula:

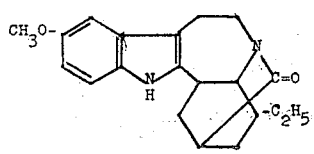

11. A compound of the formula:
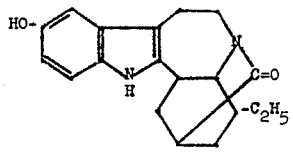
12. A compound of the formula:
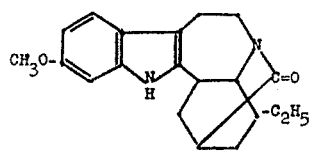
References Cited in the file of this patent
UNITED STATES PATENTS
2,813,873  Janot et al. _____ Nov. 19, 1957
OTHER REFERENCES
Burchhardt: Helv. Chim. Acta, vol. 36, pages 1337–1344 (1953).
Goutarel: Ann. Pharm. Franc, vol. 11, pages 272–4 (1953).